Aug. 2, 1960  C. A. PARSKE ET AL  2,947,227
TWIN SCREW ELEVATING MECHANISM
Filed Nov. 12, 1957  2 Sheets-Sheet 1

INVENTOR.
Charles A. Parske
Kurt A. Riedel
BY
Elroy J. Wutochel
Attorney

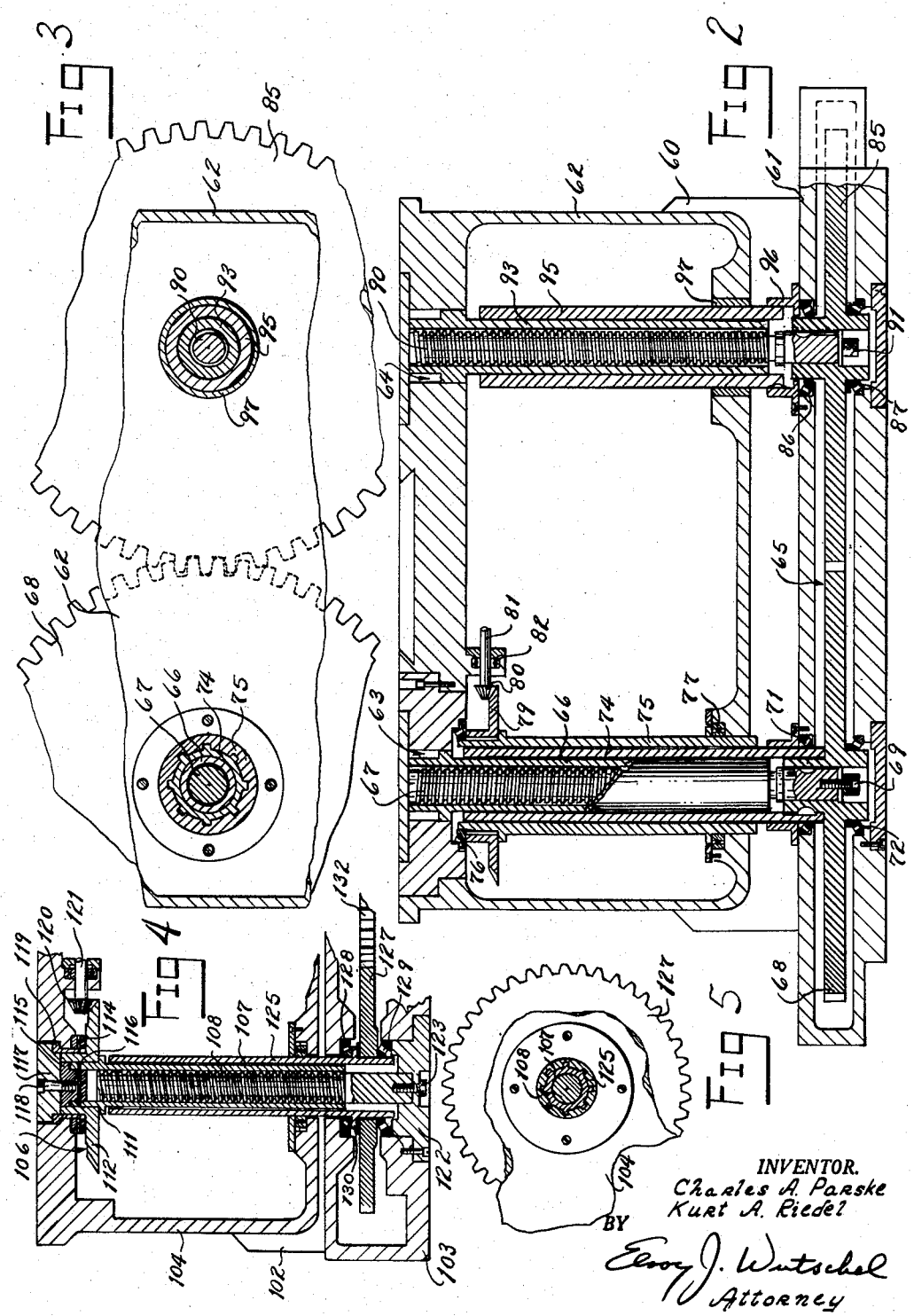

United States Patent Office 2,947,227
Patented Aug. 2, 1960

2,947,227

TWIN SCREW ELEVATING MECHANISM

Charles A. Parske and Kurt A. Riedel, Milwaukee, Wis., assignors to Kearney & Trecker Corporation, West Allis, Wis., a corporation of Wisconsin Filed Nov. 12, 1957, Ser. No. 695,883

9 Claims. (Cl. 90—58)

This invention relates to machine tools and more particularly to an improved twin screw elevating mechanism for the vertically movable work supports of a knee and column type milling machine.

The principal object of this invention is to provide an improved elevating mechanism that is operative to resist varying degrees of unbalanced load on the vertically movable knee of a knee and column type milling machine.

Another object of the invention is to provide improved means for synchronizing a pair of spaced apart translating mechanisms operative to effect equalized vertical movement of a milling machine work support.

Another object is to provide in a knee and column type milling machine a synchronizing mechanism located in the column base and connected to synchronize operation of a pair of elevating mechanisms operative to effect vertical adjustment of a machine tool knee.

Another object of the invention is to provide a twin screw elevating mechanism, connected for synchronized operation with a minimum of the power transmitting transfer mechanism contained within the vertically adjustable knee.

A further object of the invention is to provide an improved telescoping drive in combination with a synchronizing mechanism for a twin screw elevating mechanism in a knee and column type milling machine.

A still further object of the invention is to provide a simplified twin screw elevating mechanism for the vertically movable knee of a milling machine.

According to this invention, a milling machine is provided with a vertically upstanding column having a forwardly projecting base, with a vertically movable knee structure slidably carried by the column for vertical adjustment above the base. A pair of slidably superimposed work supports carried by the upper surface of the knee are rectilinearly movable in mutually transverse planes relative to a power driven tool spindle journalled within the upper portion of the column. To effect an equalized vertical adjustment of the knee relative to the column base, a pair of selectively extensible elevating mechanisms secured at their lower end to the base are adapted to extend upwardly within the knee. Power for driving the elevating mechanisms is derived from a power driven feed transmission in the knee and transmitted to the column base. The power transmitting apparatus comprises in part a telescoping splined connection connected to drive a synchronizing mechanism contained within the base, and that is in turn connected to effect simultaneous actuation of the elevating mechanisms for effecting an equalized vertical adjustment of the knee along the column.

The foregoing and other objects of the invention which will become more apparent from the following detailed description of mechanisms exemplifying preferred embodiments of the invention, may be achieved by the apparatus described herein in connection with the accompanying drawings, in which:

Fig. 2 is an enlarged fragmentary view of a knee type milling machine in longitudinal vertical section through the knee and a portion of the column base and showing a modified form of the invention;

Fig. 3 is a fragmentary view in transverse horizontal section of the modified form of the invention showing the driving interconnection between the screws, with certain portions of the machine being broken away;

Fig. 4 is a fragmentary view in longitudinal vertical section through portions of a machine knee and associated column base, showing a further modification of the invention; and Fig. 5 is a fragmentary view in transverse horizontal section of the modification shown in Fig. 4.

Figure 1:
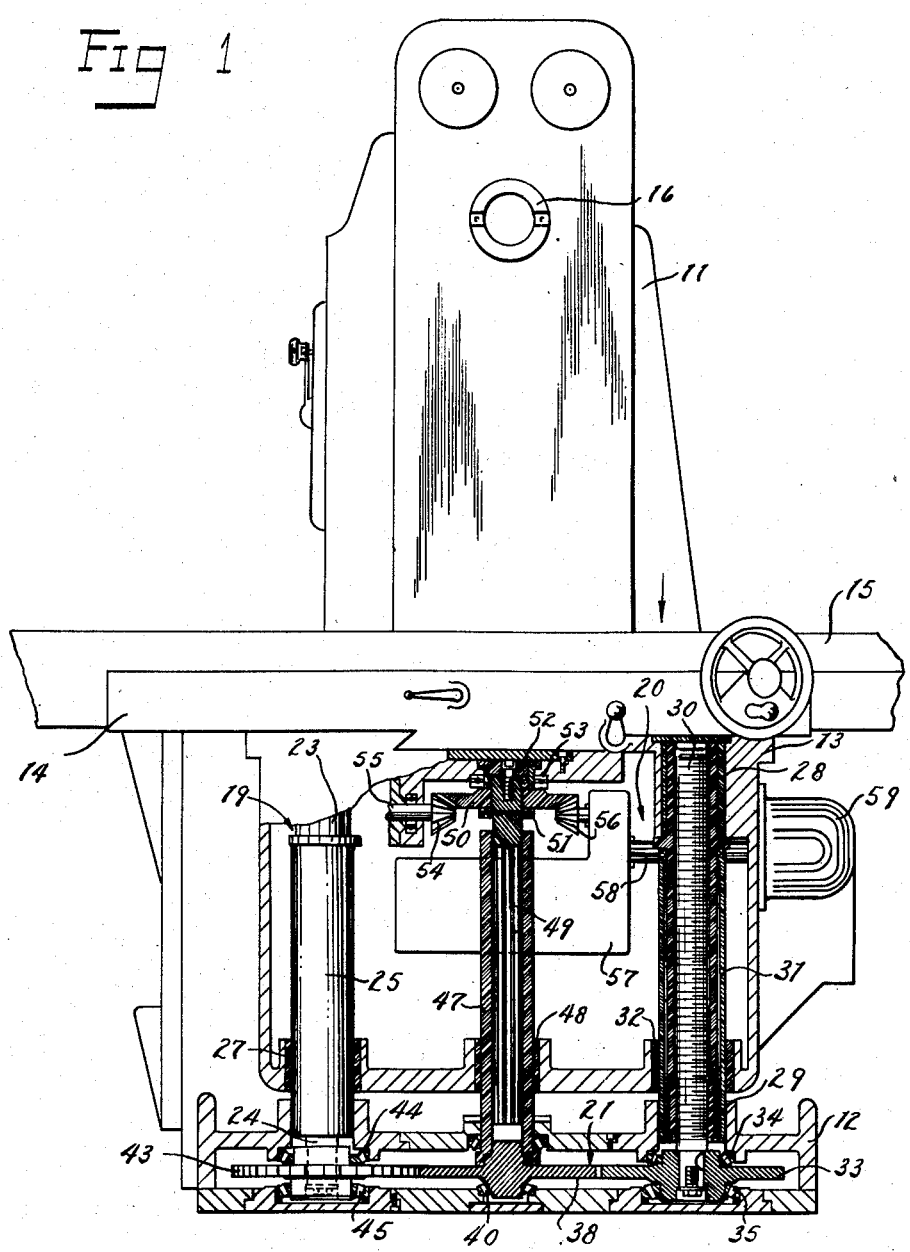
Figure 1 is a view principally in front elevation of a knee and column type milling machine, with parts of the machine having been broken away to show a portion of the internal operating mechanism.

Referring to Fig. 1 of the drawings, there is shown a knee and column type milling machine provided with a vertically upstanding column 11 integrally formed with a forwardly projecting hollow base 12. A hollow work supporting knee 13 slidably carried by the column 11 for selective movement above the base 12, is disposed to support a slidably superimposed pair of work supports including a saddle 14 and a worktable 15. As is well known in the machine tool art, separate manual and power operable means (not shown) are connectable to effect transverse movement of the saddle 14 and longitudinal movement of the worktable 15. The arrangement is such that a workpiece (not shown) secured to the worktable 15 may be selectively moved relative to a power driven tool spindle 16 journalled to rotate within the upper portion of the column 11.

To effect selective vertical movement of the knee 13, a pair of selectively extensible elevating or translating mechanisms 19 and 20 are operatively interconnected in longitudinally spaced parallelism between the knee 13 and the column base 12. To provide for simultaneous actuation of the elevating mechanisms 19 and 20, a synchronizing power transmitting drive mechanism 21 comprising a plurality of intermeshing gears journalled within the base 12 are operatively connected therebetween.

Both of the elevating mechanisms 19 and 20 are of identical construction, the left one comprising essentially an elongated tubular nut 23 fixedly secured within the knee and a cooperating screw 24 journalled to rotate at its lower end within the column base 12. To protect the threaded portion of the screw 24, a tubular sleeve 25 fixedly secured at its lower end to the column base 12 is disposed to extend upwardly to slidably engage the outer periphery of the tubular nut 23, and at the same time slidably engage a bearing sleeve 27 in the knee.

In a like manner, the right elevating mechanism 20 comprises an elongated tubular nut 28 fixedly secured at its upper end in a bored opening formed within the knee and being provided at its extreme lower end with an internally threaded portion 29. The elongated tubular nut 28 is threadedly engaged by a rotatable screw 30 journalled to rotate in the column base 12. To protect the screw 30, a concentrically disposed tubular sleeve 31 secured within a circular flange integrally formed with the base 12 extends upwardly in a manner to encircle and slidably engage the outer periphery of the tubular nut 28. To provide lateral stability for the protective tubular sleeve 31, the outer periphery thereof is constrained for slidable movement within a concentrically formed tubular bearing sleeve 32 fixedly carried within a circular bored opening formed in the underside of the housing for the knee 13. It will be apparent that the slidable engagement between the outer periphery of the stationary tubular nuts 23 and 28 within the cooperating sleeves 25 and 31 respectively, provides additional stability to the entire knee 13 and superimposed work supports. For example, as the knee 13 is adjusted to its uppermost position, the sleeve bearing 32 and the sleeve bearing 27 will in turn engage the upper circular portions of the protective sleeves 31 and 25 to maintain the tubular nuts 28 and 23 and the elevating screws 30 and 24 respectively in proper concentricity to each other. Likewise, in addition to maintaining proper concentricity between the screw and nut, the telescoping sliding engagement between the sleeve bearing 32, the outer periphery of the protective sleeve 31, and the slidable engagement between the tubular sleeve 31 and elongated nut 28 affords a certain amount of additional stability when considered in combination with the similarly cooperating parts associated with the left elevating mechanism 19.

For effecting extensible movement of the right translating mechanism 20, the lower end of the elevating screw 30 is fixedly secured and keyed to a gear 33 that is journalled to rotate in opposed antifriction bearings 34 and 35. The outer races of the bearings 34 and 35 are both supported within flanged circular openings formed within the hollow column base 12. To rotate the screw 30 in selected direction, the gear 33 secured thereto is disposed to meshingly engage a central drive gear 38 rotatably journalled within the column base by means of an upper bearing 39 and a lower opposed bearing 40.

The central rotatable drive gear 38 is likewise disposed to engage a gear 43 fixedly secured and keyed to the lower end of the left elevating screw 24, and rotatably supported in opposed antifriction bearings 44 and 45. Thus, rotation of the central drive gear 38 transmits power to rotate the gears 43 and 33 for effecting simultaneous rotation of the elevating screws 24 and 30. By means of this arrangement, both of the elevating screws 24 and 30 are retained in constant positions of angularity relative to each other and are both driven to rotate in the same direction for effecting an equalized upward or downward movement of the knee 13.

Power for rotating the gear 38, is derived from an upwardly extending internally splined drive shaft 47 that is keyed at its lower end to the gear 38 and provided with a flanged lower shoulder directly engaging the inner race of the upper bearing 39. Thus, the upper bearing 39 rotatably supports both the lower end of the tubular drive shaft 47, as well as the upper hub of the gear 38. A sleeve bearing 48 contained within a flanged bored opening formed in the underside of the knee 13 is disposed to engage the periphery of the tubular shaft 47, thereby supporting it for both relative axial and rotatable movement irrespective of the vertically adjusted position of the knee 13. The tubular drive shaft 47 is in turn in engagement with an externally splined drive shaft 49 that is also splined to a driving gear 50. The drive gear 50 is seated between a collar 51 pinned directly to the splined shaft and an upper antifriction thrust bearing 53. To effect this result, a flanged circular thrust washer 52 is fixedly secured to the upper end of the splined shaft 49 by means of a cap screw, as shown in Fig. 1.

To move the knee 13 vertically, the drive gear 50 and splined shaft 49 are connected to be driven both by manual means as well as power operated feed transmission mechanism. To accomplish this, the gear 50 is meshingly engaged by a gear 54 secured to the inner end of a shaft 55 journalled within the knee 13. A manually engageable hand crank (not shown) is connected to rotate the shaft 55 in well known manner.

At its opposite side, the gear 50 is engaged by a bevel gear 56 integrally formed with a horizontal drive shaft that is journalled to rotate within a variable speed drive mechanism 57, that may be of the well known shiftable gear type. An input drive shaft 58 journalled at one end to rotate directly in the variable speed mechanism 57 is connected at its opposite end to receive driving power from a selectively energizable motor 59 secured directly to the knee 13. A power supply circuit (not shown) is connectable in well known manner to effect energization of the feed driving motor 59, and a feed selecting mechanism (not shown) is connected to so adjust the variable speed mechanism 57 as to selectively vary the speed of the power driven bevel gear 56. By means of this arrangement, the splined shaft 49, as well as the cooperating tubular drive shaft 47, may be rotated at selected rate to effect an equalized vertical adjustment of the knee 13 relative to the column 11.

Since the pitch diameter of the elevating drive gears 43 and 33 is approximately five times greater than the diameter of each of the screws 24 and 30, the screws are maintained in constant positions of angularity relative to each other as well as to the cooperating tubular nuts 23 and 28. This is due to the fact that any backlash occuring between the gears 43, 38 and 33, even though permitting slight angular movement between the gears, produces an immeasurable similar movement of the spaced apart screws 24 and 30.

Another important advantage of the invention is the fact that driving power is transmitted directly to the central drive gear 38, and thence to the cooperatively meshing transfer gears 43 and 33. Thus, even though backlash between these gears was excessive, reversed rotation of the central driving gear 38 will not change the relative positions of angularity between the driven gears 43 and 33. Assume, for example, that excessive lash of one-eighth inch existed between the central gear 38 and each of the driven gears 43 and 33 respectively. Then assume that the central gear is rotated into driving engagement with both of these gears and synchronism between the elevating mechanisms 19 and 20 established with such condition existing. If the gear 38 is then rotated in an opposite direction, the gear teeth thereof will move approximately one-eighth of an inch before again engaging the teeth of the gears 43 and 33 for rotation to effect simultaneous actuation of the elevating mechanisms 19 and 20. It will be apparent, therefore, that positive synchronism is always established between the elevating mechanisms 19 and 20, irrespective of unusual or excessive backlash that may result over periods of continued use.

In a modified form of the invention, as shown in Figs. 2 and 3, the telescoping power transmitting apparatus disposed to transmit power from the knee to the base is arranged in concentric relationship with one or another of a pair of spaced apart elevating mechanisms and connected to maintain synchronism therebetween. As shown in Fig. 2, a vertically upstanding column structure 60 provided with an integrally formed forwardly extending base 61 is disposed to slidably carry on its front face a hollow work supporting knee 62 for vertical adjustment above the base 61. Interconnected dovetails (not shown) are disposed to maintain the rearward face of the knee 62 in slidable engagement with the front vertical column 69 in well known manner.

To effect vertical movement of the knee 62, a pair of selectively extensible translating mechanisms 63 and 64 are operatively interconnected between the knee 62 and the column base 61. A power driven synchronizing mechanism 65 contained within the hollow column base 61 is connected to effect a simultaneous actuation of the translating or elevating mechanisms 63 and 64. The left elevating mechanism 63 comprises essentially an elongated tubular nut 66 fixedly secured at its upper end within the knee and disposed to cooperate with a rotatable elevating screw 67 that is journalled at its lower end to rotate in the column base 61. The elongated tubular nut 66 is supported at its upper end within a circular bored opening formed within the upper inner portion of the knee 62. The lower end of the elevating screw 67 is keyed to the hub of a gear 68 and secured thereto by means of a cap screw 69. The gear 68 is journalled to rotate within the hollow column base 61 by means of opposed antifriction bearings 71 and 72. The upper hub of the gear 68 does not directly engage the inner race of the bearing 71. Instead, the upper hub of the gear 68 is keyed to an externally splined, tubular driven shaft 74, the lower end of the shaft 74 being rotatably supported by the inner face of the antifriction bearing 71.

The tubular driven shaft 74 extends upwardly within the knee 62, and is disposed in slidable telescoping engagement with the periphery of the downwardly extending tubular nut 66. On its outer periphery, the driven shaft 74 is provided with splines disposed to engage internal splines presented by a rotatable tubular drive shaft 75 journalled within the knee. The tubular drive shaft 75 is rotatably supported at its upper end by the inner race of an antifriction bearing 76, and at its lower end by an antifriction bearing 77. Both of the bearings 76 and 77 are disposed to have their outer races seated within circular flanged recesses respectively presented by the upper and lower knee walls.

A drive bevel gear 79 keyed to the tubular drive shaft 75, is engaged by a cooperating bevel gear 80 carried by a horizontal shaft 81 journalled to rotate in an antifriction bearing 82. As hereinbefore described with reference to Fig. 1, both manual and power operable means are connectable to rotate the shaft 81, Fig. 2, for in turn rotating the gear 79 and tubular internally splined drive shaft 75. It will be apparent that rotation of the drive shaft 75 effects like rotation of the externally splined shaft 74, the gear 68 and the upwardly extending elevating screw 67 keyed to the gear.

Rotation of the gear 68 operates to rotate a meshing gear 85 in an opposite direction. The gear 85 is likewise rotatably journalled within the hollow column base 61 by means of an upper bearing 86 and a lower bearing 87. An upwardly extending elevating screw 90 is keyed within a central bore presented by the gear 85 and secured thereto by means of a cap screw 91 and a cooperating thrust washer. Inasmuch as the two gears 68 and 85 comprising the synchronizing mechanism 65 rotate in opposite directions, it will be noted that the associated elevating screws 67 and 90 are provided with opposite threads.

The rotatable right elevating screw 90 is disposed to engage the lower threaded portion of an elongated tubular elevating nut 93 fixedly secured against rotation at its opposite end within the knee 62. The tubular, non-rotatable nut 93, together with the cooperating rotatable elevating screw 90, comprise the principal cooperatively engaged parts of the right elevating mechanism 64. A flanged circular bracket 96 secured to the column base 61 is disposed to support a concentrically positioned, upwardly extending stationary sleeve 95. The tubular sleeve 95 is disposed to slidably engage the outer periphery of the stationary tubular nut 93 to provide additional stability for the knee 62. Although neither the tubular nut 93 secured within the knee nor the sleeve 95 secured to the base rotate, they are continuously retained in slidable engagement irrespective of the vertically adjusted position of the knee 62 relative to the column base 61. A sleeve bearing 97 fixedly carried within a circular recess formed in the underside of the knee is, in turn, disposed to slidably engage the outer periphery of the relatively movable tubular sleeve 95. As the knee 62 is moved to an upper position, therefore, it will be apparent that the sleeve bearing 97 will in turn engage an upper portion of the elongated tubular sleeve 95, thereby restraining the central extended portion of the translating mechanism 64 against lateral deflection.

A further modified form of the invention is illustrated in Figs. 4 and 5. As there shown, an upwardly extending vertical column 102 provided with an integrally formed base 103 is disposed to slidably support a hollow knee 104 for vertical movement above the base. A selectively extensible left elevating mechanism 106 is operatively connected between the knee 104 and the hollow column base 103 in a manner to effect vertical knee movement. The elevating mechanism 106 shown in Fig. 4 is disposed to operate in synchronism with another elevating mechanism (not shown) of identical construction that is likewise operatively connected between the knee 104 and column base 103. The general arrangement and longitudinal parallel spacing between the elevating mechanism 106 and its associated mechanism is generally similar to that shown and described with reference to Fig. 2. However, the arrangement and connection of the drive mechanism for transmitting power from within the knee to drive the dual elevating mechanism is considerably different. The elevating mechanism 106 shown in Fig. 4 comprises essentially an elongated rotatable tubular nut 107 journalled at its upper end within the knee and disposed with its lower threaded end to operatively engage an elevating screw 108 fixedly secured against rotation at its lower end within the base 103.

Toward its upper end the tubular nut 107 is provided with a flanged shoulder 111 abutting the underside of a gear 112, the upper face of which is disposed to abut the lower race of an antifriction bearing 114. A circular flanged plug 115 is secured within the upper portion of the tubular nut 107 by means of a pin 116 which likewise engages the upwardly extending hub of the gear 112. A circular cap member 117 is fixedly secured to the plug member 115 by means of a cap screw 118, thereby retaining the gear 112 and tubular nut 107 in the operatively disposed relationship shown in Fig. 4. The cap member 117 is of slightly larger diameter in a manner to engage a flanged sleeve bearing 119, the outer periphery of which engages a circular bored recess formed in the knee. The gear 112 is driven by a cooperating bevel gear 120 secured to a horizontally journalled shaft 121 that is connectable to be rotated in response to manual or power driven means, as hereinbefore described with respect to Fig. 1.

The cooperating non-rotatable elevating screw 108 is fixedly secured at its lower end to a circular flanged bearing carrier 122 by means of a cap screw 123. The carrier 122 is secured within a circular recess formed in the base by means of cap screws. Rotation of the tubular nut 107 operates to effect a relative extensible movement between the nut 107 and the cooperating stationary screw 108. At the same time, rotation of the tubular nut 107 operates to transmit power for driving the spaced apart elevating screw mechanism (not shown).

To accomplish this, the elongated tubular nut 107 is provided on its periphery with longitudinal splines disposed to slidably engage cooperating internal splines presented by a concentrically rotatable tubular driven shaft or sleeve 125, as shown in Figs. 4 and 5. The tubular driven shaft 125 is keyed at its lower end to a transfer gear 127 journalled to rotate within the hollow base 103 by means of bearings 128 and 129. A flanged shoulder 130 integrally formed with the rotatable drive shaft 125 is interposed in abutting engagement between the inner race of the bearing 128 and the upper face of the transfer gear 127.

By means of this arrangement, it will be apparent that rotation of the tubular nut 107 effects corresponding rotation of the tubular drive shaft 125 and the transfer gear 127 journalled in the base. It will likewise be apparent that the elongated tubular nut 107 performs a dual function by being retained in threaded engagement with the elevating screw 108, and simultaneously in splined engagement with the tubular drive shaft 125. The threaded coaction between the stationary screw 108 and rotatable nut 107 constitute an extensible elevating mechanism; and the splined coaction between the periphery of the nut 107 and the rotatable tubular shaft 125 constitute a telescoping power transmitting apparatus. The transfer gear 127 is maintained in meshing engagement with another transfer gear 132 journalled within the base and connected in like manner to rotate an upwardly extending internally splined drive shaft (not shown). Thus, operation of the left elevating mechanism 106 effects simultaneous operation of a spaced apart elevating mechanism (not shown) of identical construction excepting of opposite thread.

While the invention has been shown and described as applied to the vertically movable knee of a milling machine, it is to be understood that it may be incorporated with equal advantage in other major, movable members of a machine tool. Although particular structures have been shown and described and considerable detail as exemplifying the manner in which the various embodiments of the invention may be practiced, it will be apparent to those skilled in the art to which this invention relates that various modifications of the structures herein shown may be effected without departing from the spirit and scope of the invention as defined in the subjoined claims.

The principles of this invention having now been fully explained in connection with the foregoing description, we hereby claim as our invention:

1. In a milling machine, a vertically upstanding column provided with a forwardly projecting base, a hollow knee slidably mounted on said column for vertical movement above said base, a pair of elevating mechanisms operatively interconnected between said base and said knee, a pair of slide bearings mounted in suitable openings in the bottom wall of said knee, a pair of protective sleeves, one end of each of said sleeves being secured to the forwardly projecting base of the column and extending upwardly therefrom into said knee with its periphery in sliding engagement with one of said slide bearings and its interior surface in sliding engagement with one of said elevating mechanisms to impart stability to said knee as well as to protect said elevating mechanisms, a source of driving power contained within said knee, a telescoping power transmitting shaft journalled at its upper end in said knee and at its lower end in said column base, said telescoping shaft being connected to be driven by said power source, and a plurality of operatively intermeshing synchronizing gears journalled within said base connected to be driven by said telescoping shaft, said synchronizing gears being connected to transmit power for effecting simultaneous synchronized actuation of said elevating mechanisms.

2. In a machine tool, a frame, a work support carried for relative rectilinear movement by said frame, a pair of stationary tubular nuts carried in spaced apart parallelism in said work support, a pair of rotatable elevating screws journalled at one end in said frame in spaced parallelism in a manner to threadedly engage said stationary tubular nuts, a pair of slide bearings mounted in suitable openings in said work support, a pair of protective sleeves, one end of each of said sleeves being secured to said frame and extending upwardly therefrom into said work support with its periphery in sliding engagement with one of said slide bearings and its interior surface in sliding engagement with one of said tubular nuts to impart stability to said work support as well as to protect said elevating screws, a telescoping power transmitting shaft rotatably journalled at one end in said work support and at the other end in said frame, a source of driving power in said work support connected to drive said power transmitting shaft, a plurality of operatively interconnected gears journalled in said frame connected to be driven by the opposite end of said power transmitting shaft, said gears being connected to effect a simultaneous equalized actuation of said elevating screws, and means for actuating said source of driving power in said work support for effecting a selective rectilinear movement of said work support relative to said frame.

3. In a milling machine provided with a column having a forwardly projecting base, a hollow knee slidably carried by said column for selective movement above said base, a plurality of slidably superimposed work supports movably carried by said knee for selective movement in mutually transverse planes relative to said column, a pair of spaced apart elevating mechanisms operatively interconnected between said knee and said column base for effecting vertical movement of said knee and said work supports, operatively interconnected gears journaled within said column base connected to effect a synchronized operation of said elevating mechanisms, a source of driving power within said knee, a pair of slide bearings mounted in suitable openings in the bottom wall of said knee, a telescoping power transmitting shaft encircling the first of said elevating mechanisms and being journalled at one end within said knee and at the opposite end within said column base with its periphery in sliding engagement with the first of said two slide bearings, said telescoping power transmitting shaft being connected to transmit power from said source to drive said interconnected gears journalled within said base and a protective sleeve having its lower end secured to the forwardly projecting base of the column and extending upwardly therefrom into said knee with its periphery in sliding engagement with the second of said slide bearings and its interior surface in sliding engagement with the second of said elevating mechanisms to impart stability to said knee as well as to protect its associated elevating mechanism.

4. In a machine tool, a frame, a hollow work support slidably secured to said frame for rectilinear movement, a pair of translating mechanisms operatively interconnected between said work support and said frame in spaced apart parallelism, said translating mechanisms each comprising a screw and nut carried for relative rotation to effect extensible movement thereof, a plurality of gears journalled in said frame and being interconnected to effect synchronized actuation of said extensible translating mechanisms, a source of driving power in said hollow work support, a plurality of telescoping splined cooperatively engaged tubular shafts slidably surrounding one of said translating mechanisms and being operatively connected to transmit power from said source for driving said synchronizing gears in said frame to effect rectilinear movement of said work support, a second tubular shaft having one end fixed to said frame and extending upwardly to slidably engage the nut of the other said translating mechanism, and a pair of bearings mounted in suitable openings in the lower wall of said work support and movably engaging said tubular shafts.

5. In a milling machine, a vertically upstanding column provided with an integrally formed forwardly extending base, a hollow work supporting knee slidably carried by said column for selective vertical movement above said column base, a pair of spaced apart elevating mechanisms operatively interconnected between said knee and said column base, said elevating mechanisms being simultaneously extensible to effect vertical movement of said knee and to resist torsional deflection thereof, a source of driving power in said knee, a plurality of operatively interconnected gears journalled in said base being connected to effect simultaneous extensible movement of said elevating mechanisms, and a telescoping power transmitting apparatus concentrically associated with one of said elevating mechanisms and being operatively connected to transmit power from said source in said knee to drive said synchronizing gears in said column base irrespective of the position of vertical adjustment of said knee relative to said column.

6. In a milling machine, a vertically upstanding column provided with a forwardly projecting base, a hollow work support slidably carried by said column for selective vertical movement above said column base, a pair of screw and nut elevating mechanisms interconnected between said hollow work support and said column base in spaced apart parallelism, said elevating mechanisms respectively comprising a cooperating screw and nut carried for relative rotation, a plurality of interconnected gears journalled within said column base and being operatively connected to effect extensible movement of said elevating mechanism in exact synchronism to resist torsional deflection of said hollow work support, a source of driving power contained within said hollow work support, a telescoping power transmitting apparatus operatively interconnected with one of said elevating mechanisms to transmit power from said source in said knee to drive said gears in said column base, and a pair of bearings mounted in openings in said work support, one of said bearings movably engaging said power transmitting apparatus and the other said bearing movably engaging one of said elevating mechanisms whereby said work support is so supported as to resist torsional deflection irrespective of its vertical position above said column base.

7. In a milling machine, a vertical column provided with a forwardly projecting hollow base, a hollow knee slidably carried by said column for vertical movement above said base, a pair of spaced apart stationary elevating screws fixedly secured at their lower ends to said base and extending upwardly into said knee, a pair of elongated tubular nuts journalled to rotate in said knee in position to threadedly engage said elevating screws, said nuts presenting longitudinal splines on their periphery, a pair of internally splined shafts disposed to slidably engage the splined periphery of said nuts and being journalled to rotate at their lower ends in said column base, a plurality of gears journalled in said base connected to effect simultaneous rotation of said internally splined tubular shafts, and a source of power in said knee connected to drive one of said externally splined tubular nuts whereby both of said nuts are rotated in synchronism to effect equalized vertical movement of said knee.

8. In a milling machine, a vertical column provided with a forwardly projecting hollow base, a hollow knee slidably carried by said column for vertical movement above said base, a pair of spaced apart stationary elevating screws fixedly secured at their lower ends to said base and extending upwardly into said knee, a pair of elongated tubular nuts journalled to rotate in said knee in position to threadedly engage said elevating screws, said nuts presenting longitudinal splines on their periphery, a pair of internally splined shafts disposed to slidably engage the splined periphery of said nuts and being journalled to rotate at their lower ends in said column base, a plurality of gears journalled in said base connected to effect simultaneous rotation of said internally splined tubular shafts, a pair of bearings mounted in the lower wall of said knee and disposed to movably engage said internally splined tubular shafts, and a source of power in said knee connected to drive one of said externally splined tubular nuts whereby both of said nuts are rotated in synchronism to effect equalized vertical movement of said knee.

9. In a machine tool, a pair of members carried for relative rectilinear movement, a pair of selectively extensible translating mechanisms operatively interconnected between said members and being disposed in spaced apart parallelism, a synchronizing power transmitting mechanism contained within one of said members and operatively connected to effect a simultaneous operation of said translating mechanisms, a source of power contained within the other of said members, a telescoping power transmitting apparatus concentrically associated with the first of said translating mechanisms and being operatively connected to transmit power from said source for actuating said synchronizing power transmitting mechanism to effect equalized movement between said members, and a hollow sleeve fixed to one of said members and extending rectilinearly in a path parallel to member movement to slidably engage the second of said translating mechanisms, whereby said translating mechanisms are operative to resist varying degrees of unbalanced load on one of said members.

References Cited in the file of this patent

UNITED STATES PATENTS

| | | |
|---|---|---|
| 376,815 | Coleman | Jan. 24, 1888 |
| 649,175 | Johnston | May 8, 1900 |
| 1,371,772 | Blood | Mar. 15, 1921 |
| 1,444,591 | Daly | Feb. 6, 1923 |
| 1,889,930 | Morton | Dec. 6, 1932 |
| 2,375,172 | Arter | May 1, 1945 |